June 1, 1937. W. H. FRANK 2,082,281
ELECTRICAL DISTRIBUTION SYSTEM
Original Filed Dec. 1, 1933

INVENTOR.
William H. Frank
BY Daniel G. Gillen
ATTORNEY.

Patented June 1, 1937

2,082,281

UNITED STATES PATENT OFFICE 2,082,281

ELECTRICAL DISTRIBUTION SYSTEM

William H. Frank, Detroit, Mich., assignor to Bulldog Electric Products Company, Detroit, Mich., a corporation of West Virginia Original application December 1, 1933, Serial No. 700,596. Patent No. 2,025,813. Divided and this application January 9, 1936, Serial No. 58,308

8 Claims. (Cl. 247—3)

This application relates to electrical distribution systems and more particularly to systems of the type comprising a stationary elongated duct and a current lead-off device or trolley which may be moved along the duct to take current therefrom at various points along the latter.

The principal objects of the present invention are to provide duct and trolley systems wherein the duct is formed of an electrically conducting material and contains an electrically conducting bus bar insulated with respect thereto, it being intended that the duct is to form a return side of the supply line with the bus bar forming the live side of the same.

In the construction herein disclosed the duct is so formed as to provide two pairs of opposed rails, along and between which ride the supporting wheels of a trolley, the rails of each pair being spaced apart a distance substantially equal to the diameter of the trolley supporting wheels so that a single wheel engages, with adequate clearance, opposed rails, the cooperation of the parts eliminating much of the undesirable transverse shifting of the trolley in the duct as the trolley rolls along the duct.

The duct is also so formed that the bus bar contained therein is of thin ribbon-like material adequately backed and supported by the duct with its edges disposed within facing grooves provided by opposite beads of the duct, and in the construction herein disclosed the bus bar, though facing the riding slot or runway of the duct, is so disposed at a distance thereto that accidental and malicious access to the bus bar through the runway may be attained only with difficulty.

Figure 2:
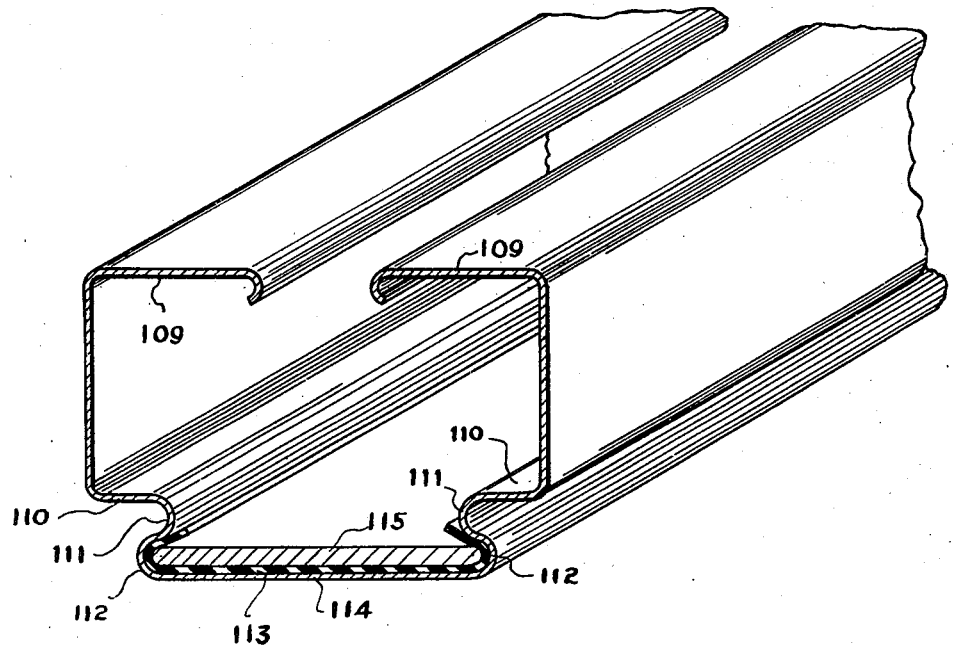

Further objects of the invention of this application will be readily understood upon reference to the following specification relating to the appended drawing. In this drawing, Fig. 1 is a sectional view to small scale of the bus duct with a trolley diagrammatically disclosed as being contained therein;

Fig. 2 is a larger scale view of a fragment of duct.

Figure 1:
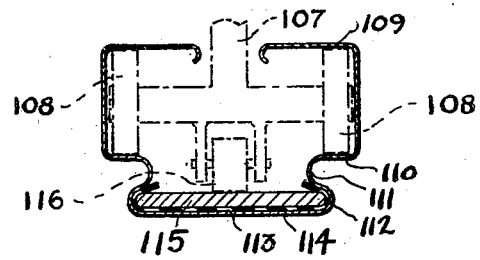

Referring to the drawing, it will be seen that Fig. 1 discloses a trolley 107 whose supporting wheels 108 are disposed between and ride along opposed rails 109—110 of the duct, each wheel engaging, with adequate clearance, two rails 109 and 110, whereby undesirable transverse shifting of the trolley as it rolls along the duct is eliminated.

The rails 110 are connected by retroverted beads 111 to beads 112 which are connected by the bottom wall 113 of the duct and disposed against this bottom wall with its folded edges received within the beads 112 is a folded strip of insulation 114 enshrouding a flat ribbon-like bus bar 115, only a flat surface of which is exposed to the interior of the duct. The disposition of the bus bar and its insulation in the facing grooves provided by the opposed beads 112 of the duct together with the disposition of the bus bar and its insulation against the continuous backing provided by the bottom 113 of the duct provide a satisfactory support and anchorage for the bus bar so that as a trolley contact 116 rolls along the bus bar undue flexure of the parts of the bus duct will not result.

It is intended that the duct itself be made of electrically conducting material such as sheet steel and the bus bar be made of suitable bus bar material such as copper, and that the supply line of the system have its live side represented by the bus bar and its return side represented by the duct. For this reason it is intended that the supporting wheels 108 of the trolley not only be of electrically conducting material but also be connected to one side of the load to be supplied from the bus duct through conductors embedded within the trolley and that the trolley contacts 116 be of copper or the like and be connected to the other side of the load supplied from the bus duct by means of a second electrical conductor embedded within the trolley. Inasmuch as this application does not relate to the details of construction of the trolleys per se, further disclosure of the trolley parts is not herein made.

It is understood that this application is a division of my prior copending application, Serial No. 700,596, filed December 1, 1933, which issued into a patent on December 31, 1935, Patent No. 2,025,813.

I claim:

1. A trolley bus duct comprising a duct of electrically conducting material having a slotted wall and having mounted on the wall opposite the slotted wall a bus bar facing the slot, the bus bar being formed of a thin, wide, flat ribbon of electrically conducting material, the wall mounting it having longitudinally extending elongated folds folded around and receiving the edges of the bus bar.

2. A trolley bus duct comprising a duct of electrically conducting material having a slotted wall and having mounted on the wall opposite the slotted wall a bus bar facing the slot, the bus bar being formed of a thin, wide, flat ribbon of electrically conducting material, the wall mounting it having longitudinally extending elongated folds folded around and receiving the edges of the bus bar, the slotted wall and the wall opposite thereto being formed to provide rails for trolley wheels.

3. A trolley bus duct comprising a duct of electrically conducting material having a slotted wall and having the wall opposite the slotted wall provided with a wide, shallow groove intermediate the side edges of such wall, the groove being formed to receive a bus bar facing the slot, which bus bar is formed of a thin, wide, flat ribbon of electrically conducting material, the wall of the groove having longitudinally extending elongated folds folded around and receiving the edges of the bus bar.

4. A trolley bus duct comprising a duct of electrically conducting material having a slotted wall and having the wall opposite the slotted wall provided with a wide, shallow groove intermediate the side edges of such wall, the groove being formed to receive a bus bar facing the slot, which bus bar is formed of a thin, wide, flat ribbon of electrically conducting material, those portions of the opposite wall between which is the bus bar receiving groove being closer to the slotted wall than is the bus bar.

5. A trolley bus duct comprising a duct of electrically conducting material having a slotted wall and having mounted on the wall opposite the slotted wall a bus bar facing the slot, the bus bar being formed of a thin, wide, flat ribbon of electrically conducting material, the wall mounting it having longitudinally extending elongated formations interlocked with the edges of the bus bar.

6. A trolley bus duct comprising a duct of electrically conducting material having a slotted wall and having the wall opposite the slotted wall provided with a wide, shallow groove intermediate the side edges of such wall, the groove being formed to receive a bus bar facing the slot, which bus bar is formed of a thin, wide, flat ribbon of electrically conducting material, the wall of the groove having longitudinally extending elongated formations interlocked with the edges of the bus bar.

7. A trolley bus duct comprising a duct of electrically conducting material having a slotted wall and having the wall opposite the slotted wall provided wth a wide, shallow groove intermediate the side edges of such wall, the groove being formed to receive a bus bar facing the slot, which bus bar is formed of a thin, wide, flat ribbon of electrically conducting material, those portions of the opposite wall between which is the bus bar receiving groove being closer to the slotted wall than is the bus bar, the groove having longitudinally extending elongated formations interlocked with the edges of the bus bar.

8. A trolley bus duct comprising a duct of electrically conducting material having a slotted wall and having the wall opposite the slotted wall provided with a wide, shallow groove intermediate the side edges of such wall, the groove being formed to receive a bus bar facing the slot, which bus bar is formed of a thin, wide, flat ribbon of electrically conducting material, those portions of the opposite wall between which is the bus bar receiving groove being closer to the slotted wall than is the bus bar, the groove having longitudinally extending elongated formations interlocked with the edges of the bus bar.

WILLIAM H. FRANK.